(12) United States Patent
Kim et al.

(10) Patent No.: US 12,743,880 B2
(45) Date of Patent: Sep. 22, 2026

(54) OPTICAL 4f SYSTEM PERFORMING EXTENDED CONVOLUTION OPERATION AND OPERATING METHOD THEREOF

(71) Applicant: ELECTRONICS AND TELECOMMUNICATIONS RESEARCH INSTITUTE, Daejeon (KR)

(72) Inventors: Ik-Soon Kim, Daejeon (KR); Jin Hwa Gene, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 945 days.

(21) Appl. No.: 18/085,716

(22) Filed: Dec. 21, 2022

(65) Prior Publication Data

US 2023/0206620 A1 Jun. 29, 2023

(30) Foreign Application Priority Data

Dec. 23, 2021 (KR) ........................ 10-2021-0185587
Dec. 13, 2022 (KR) ........................ 10-2022-0173746

(51) Int. Cl.
*G06N 20/00* (2019.01)
*G02B 27/46* (2006.01)
*G06V 10/88* (2022.01)

(52) U.S. Cl.
CPC .......... *G06V 10/893* (2022.01); *G02B 27/46* (2013.01); *G06N 20/00* (2019.01)

(58) Field of Classification Search
None
See application file for complete search history.

(56) References Cited

U.S. PATENT DOCUMENTS 6,424,449 B1 * 7/2002 Namiki .................. G02B 27/46 359/247
7,228,005 B1 * 6/2007 Yuan ......................... G06T 5/73 382/280

(Continued)

FOREIGN PATENT DOCUMENTS

EP 3754488 A2 12/2020
EP 3242253 B1 7/2021

(Continued)

OTHER PUBLICATIONS

Qiuhao Wu et al., "Multi-layer optical Fourier neural network based on the convolution theorem", AIP Advance 11, 055012 (2021); doi: 10.1063/5.0055446.

(Continued)

*Primary Examiner* — Xuyang Xia
(74) *Attorney, Agent, or Firm* — LRK PATENT LAW FIRM

(57) ABSTRACT

Disclosed is an optical system which includes a first lens that receives input data from an object, a kernel that performs a first Fourier transform on the input data and generates learning data by performing calculation on a result of the first Fourier transform and pattern data, and a second lens that generates result data by performing a second Fourier transform on the learning data, and the input data, the learning data, and the result data include both a positive number and a negative number.

16 Claims, 5 Drawing Sheets

(56) References Cited

U.S. PATENT DOCUMENTS

| | | | | |
|---|---|---|---|---|
| 11,144,819 | B2 | 10/2021 | Gibson et al. | |
| 11,200,487 | B1 * | 12/2021 | Grundmann | G02F 1/35 |
| 11,475,286 | B2 | 10/2022 | Barik et al. | |
| 11,699,070 | B2 | 7/2023 | El-Khamy et al. | |
| 12,033,066 | B2 | 7/2024 | Macfaden | |
| 2012/0092669 | A1 * | 4/2012 | Fiolka | G01N 21/23 356/365 |
| 2015/0131066 | A1 * | 5/2015 | Yamazoe | G03F 7/70616 355/53 |
| 2016/0216691 | A1 | 7/2016 | Kim et al. | |
| 2016/0216692 | A1 | 7/2016 | Kim et al. | |
| 2021/0056358 | A1 * | 2/2021 | Macfaden | G06N 3/04 |
| 2021/0357737 | A1 * | 11/2021 | Hamerly | G06N 3/067 |

FOREIGN PATENT DOCUMENTS

| | | | |
|---|---|---|---|
| JP | 2021528721 | A | 10/2021 |
| KR | 10-2020-0107755 | A | 9/2020 |

OTHER PUBLICATIONS

Shurui Li et al., "Channel Tiling for Improved Performance and Accuracy of Optical Neural Network Accelerators", arXiv:2011. 07391v2 [cs.ET] Jan. 15, 2021.

* cited by examiner

FIG. 3

(FT1) Homogeneity:

$$\mathfrak{F}\{a \cdot f(x,y)\}(u,v) = a \cdot \mathfrak{F}\{f(x,y)\}(u,v)$$

(FT2) Additivity:

$$\mathfrak{F}\{f(x,y) + g(x,y)\}(u,v) = \mathfrak{F}\{f(x,y)\}(u,v) + \mathfrak{F}\{g(x,y)\}(u,v)$$

(FT3) Fourier Transform for convolution:

$$\mathfrak{F}\{f(x,y) * g(x,y)\}(u,v) = \mathfrak{F}\{f(x,y)\}(u,v) \cdot \mathfrak{F}\{g(x,y)\}(u,v)$$

(IFT1) Inverse property:

$$\mathfrak{F}^{-1}\{\mathfrak{F}\{f(x,y)\}(u,v)\}(x,y) = f(x,y)$$

(IFT2) Distributive property for addition:

$$\mathfrak{F}^{-1}\{F(u,v) + G(u,v)\}(x,y) = \mathfrak{F}^{-1}\{F(u,v)\}(x,y) + \mathfrak{F}^{-1}\{G(u,v)\}(x,y)$$

FIG. 4

Theorem 1:

For all $f(x,y)$, there exist $f_1(x,y) \geq 0$ and $f_2(x,y) \geq 0$ such that $$f(x,y) = f_1(x,y) - f_2(x,y).$$

Theorem 2:

For all $G(u,v)$, there exist $G_1(u,v) \geq 0$ and $G_2(u,v) \geq 0$ such that $$G(u,v) = G_1(u,v) - G_2(u,v).$$

FIG. 5

Theorem 3:

For all $f(x,y)$, there exist $f'(x,y) \geq 0$ and $a \geq 0$ such that $$f(x,y) = f'(x,y) - a.$$

Theorem 4:

For all $G(u,v)$, there exist $G'(u,v) \geq 0$ and $b \geq 0$ such that $$G(u,v) = G'(u,v) - b.$$

OPTICAL 4f SYSTEM PERFORMING EXTENDED CONVOLUTION OPERATION AND OPERATING METHOD THEREOF

CROSS-REFERENCE TO RELATED APPLICATIONS

This application claims priority under 35 U.S.C. § 119 to Korean Patent Application No. 10-2021-0185587 filed on Dec. 23, 2021 and No. 10-2022-0173746 filed on Dec. 13, 2022, in the Korean Intellectual Property Office, the disclosures of which are incorporated by reference herein in their entireties.

BACKGROUND

1. Field of the Invention

Embodiments of the present disclosure described herein relate to a convolution operation, and more particularly, relate to an optical 4f system performing extended convolution operations and an operating method thereof.

2. Description of Related Art

A convolutional neural network (CNN) is a type of deep neural network that includes one or more convolution layers. The CNN provides good performance in image recognition, video recognition, image classification, medical image analysis, natural language processing, and time-series analysis, and fields to which the CNN is applied continue to expand.

An optical 4f system refers a system that has a structure in which two lenses are paired and transfers an image from a first lens of one side to a second lens of an opposite side; when the first and second lenses have the same focal length of "f", a distance from an object plane (or an input plane) to the first lens is "f", a distance from the first lens to the second lens is 2f, and a distance from the second lens to an image plane (or an output plane) is "f". That is, a total length from the object plane to the image plane is 4f.

Nowadays, the convolution operation using the optical 4f system is being actively researched. However, because an input and an output of the optical 4f system are proportional to the intensity of light but a value used in the convolution operation is based on the amplitude of light, it is necessary to correct the input and the output. Also, because the amplitude of light is expressed only by a positive number, when the convolution operation is performed only by using the optical 4f system without a separate auxiliary device, it is impossible to receive a value including a negative number.

SUMMARY

Embodiments of the present disclosure provide a method for extending a convolution operation of an optical 4f system such that a convolution operation is performed on an input including a negative number in the optical 4f system, an optical 4f system performing the extended convolution operation, and an operating method of the optical 4f system.

According to an embodiment, an optical system includes a first lens that receives input data from an object, a kernel that performs a first Fourier transform on the input data and generates learning data by performing calculation on a result of the first Fourier transform and pattern data, and a second lens that generates result data by performing a second Fourier transform on the learning data, and the input data, the learning data, and the result data include both a positive number and a negative number.

According to an embodiment, an operating method of an optical system which includes a first lens, a kernel, and a second lens includes receiving input data from an object through the first lens, performing a first Fourier transform on the input data through the kernel, generating learning data by performing calculation on a result of the first Fourier transform and pattern data, and generating result data by performing a second Fourier transform on the learning data, and the input data, the learning data, and the result data include both a positive number and a negative number.

BRIEF DESCRIPTION OF THE DRAWINGS

The above and other objects and features of the present disclosure will become apparent by describing in detail embodiments thereof with reference to the accompanying drawings.

FIG. 3 illustrates operation rules of Fourier transform and operation rules of inverse Fourier transform, which are used to extend a convolution operation.

FIG. 4 illustrates theorems used for extension of a convolution operation.

FIG. 5 illustrates theorems used for extension of an extended convolution operation.

DETAILED DESCRIPTION

Below, embodiments of the present disclosure will be described in detail and clearly to such an extent that one skilled in the art easily carries out the present disclosure.

In the detailed description, components described with reference to the terms "unit", "module", "block", "~er or ~or", etc. and function blocks illustrated in drawings will be implemented with software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
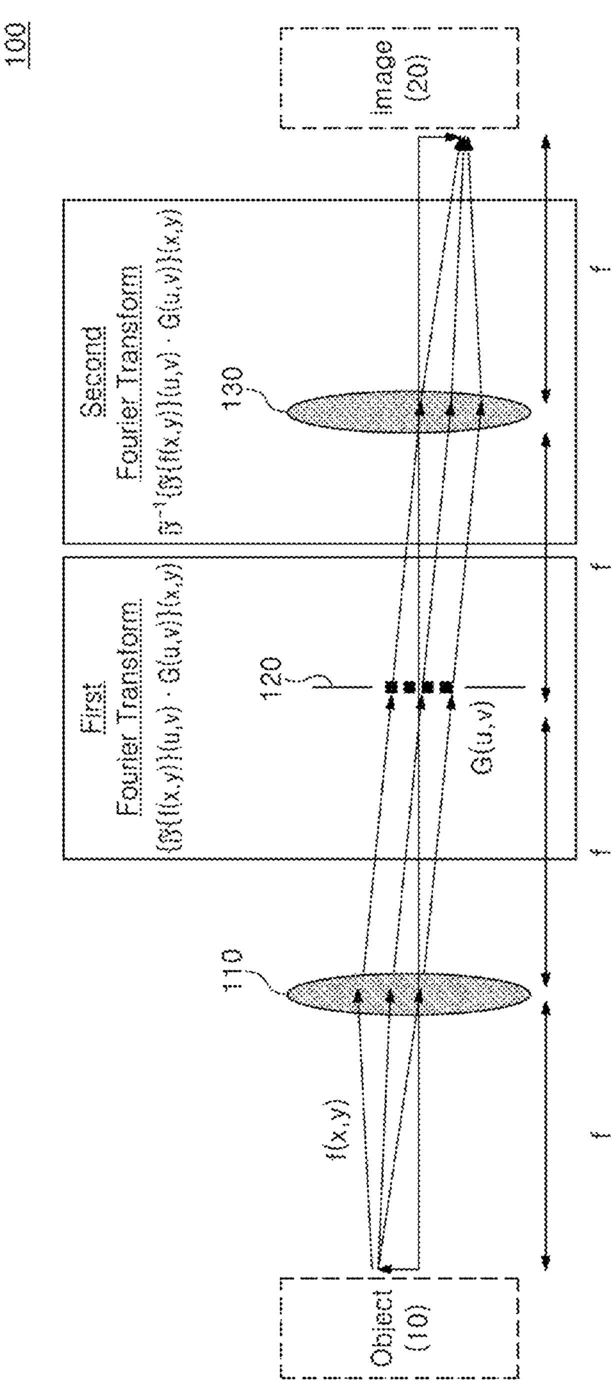
FIG. 1 is a block diagram of an optical 4f system according to an embodiment of the present disclosure.

FIG. 1 is a diagram illustrating an example of an optical 4f system 100 according to an embodiment of the present disclosure. Referring to FIG. 1, the optical 4f system 100 may include a first lens 110, a kernel 120, and a second lens 130. Assuming that a focal length of each of the first lens 110 and the second lens 130 is "f", a distance between an object 10 and the first lens 110, a distance between the first lens 110 and the second lens 130, and a distance between the second lens 130 and an image 20 are "f", 2f, and "f"; in this case, a total of length may be 4f.

The first lens 110 may receive input data f(x,y) from the object 10 and may perform a first Fourier transform at a location of the kernel 120, and the second lens 130 may perform a second Fourier transform. For example, the kernel 120 may serve as a filter between the first Fourier transform and the second Fourier transform and may include pattern data G(u,v) associated with learning. The convolution operation of the optical 4f system 100 may be implemented by performing the Fourier transform continuously two times. That is, the optical 4f system 100 may output the image 20 corresponding to a result of the convolution operation of the kernel 120 with the object 10 through the lenses 110 and 130. Herein, because the Fourier transform is performed two times, the object 10 and the image 20 are inverted (or reverse) images.

In detail, f(x,y) may correspond to the first input image or an input value of a previous CNN layer, G(u,v) may correspond to an image pattern trained in the CNN, and $\mathcal{F}^{-1}\{\mathcal{F}\{f(x,y)\}(u,v)\cdot G(u,v)\}(x,y)$ may correspond to a value (i.e., the output image 20) generated by the optical 4f system 100. {f(x,y)}(u,v) may indicate the first Fourier transform while passing through the first lens 110, which corresponds to the transformation from the x-y plane to the u-v plane. {f(x,y)}(u,v)·G(u,v) may correspond to an image pattern learning result in the form of multiplying the result of the first Fourier transform and a learning image pattern G(u,v) together. Also, $\mathcal{F}^{-1}\{\mathcal{F}\{f(x,y)\}(u,v)\cdot G(u,v)\}(x,y)$ may indicate the second Fourier transform performed while {f(x,y)}(u,v)·G(u,v) obtained by multiplying the result of the first Fourier transform and G(u,v) together passes through the second lens 130 and may be expressed in the form of inverse Fourier transform for the convenience of equation expansion in the specification.

Figure 2:
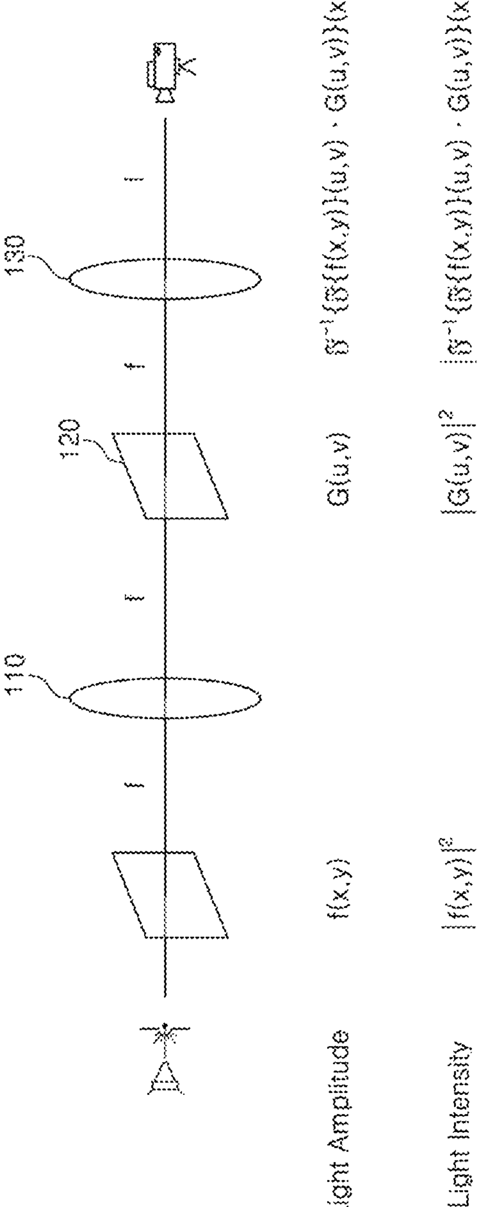
FIG. 2 is a diagram illustrating a result of expressing values associated with an operation performed in an optical 4f system of FIG. 1 through a light amplitude and a light intensity.

FIG. 2 is a diagram illustrating a result of expressing values associated with an operation performed in the optical 4f system 100 of FIG. 1 through a light amplitude and a light intensity. All f(x,y), G(u,v), and $\mathcal{F}^{-1}\{\mathcal{F}\{f(x,y)\}(u,v)\cdot G(u,v)\}(x,y)$ that are used in the convolution operation using optical 4f system 100 described above are equations based on the light amplitude, and an actual input value and actual output values of the optical 4f system 100 are proportional to the light intensity. For example, the actual input value and the actual output values may be expressed in form of $|f(x,y)|^2$, $|G(u,v)|^2$, and $|\mathcal{F}^{-1}\{\mathcal{F}\{f(x,y)\}(u,v)\cdot G(u,v)\}(x,y)|^2$. Accordingly, these values should be corrected to a form that could be used in the convolution operation. Because the light intensity at an arbitrary location is proportional to a square of the light amplitude, a value of the light amplitude may be calculated by performing a square root operation on both the input value and the output values in the convolution operation using the optical 4f system 100, and the convolution operation may then be performed.

That is, because the input value and the output values of two-dimensional data used in the convolution operation using the optical 4f system 100 are based on the light amplitude value, limitations $f(x,y)\geq 0$, $G(u,v)\geq 0$, and $\mathcal{F}^{-1}\{\mathcal{F}\{f(x,y)\}(u,v)\cdot G(u,v)\}(x,y)\geq 0$ that input and output values could be only a positive number exist. As such, it may be impossible to use an input value including a negative number and to train an image pattern including a negative number, and only a positive number may be generated as a result; in this case, some nonlinear functions may not operate, resulting in the reduction of CNN performance. Below, a convolution operation extending method for overcoming the limitations will be described.

FIG. 3 illustrates operation rules FT1 and FT2 of Fourier transform and operation rules IFT1 and IFT2 of inverse Fourier transform, which are used to extend a convolution operation. In FIG. 3, an operator "·" represents a multiplication operation, and an operator "*" represents a convolution operation. Operation rules of the Fourier transform include the homogeneity FT1 indicating that an output magnitude is proportional to an input magnitude, the additivity FT2 indicating that a total result when plural input signals are added is equal to a result of adding results of individual input signals, and the Fourier transform FT3 for convolution indicating that the convolution operation in the x-y plane is expressed by a multiplication operation in the u-v plane. Operation rules of the inverse Fourier transform include the inverse property IFT1 indicating that an original input value is obtained by performing the inverse Fourier transform on a result of the Fourier transform and the distributive property for addition IFT2.

FIG. 4 illustrates theorems used for extension of a convolution operation. With regard to f(x,y) in the x-y plane, a first theorem indicates that an input signal is expressed by a difference between signals $f_1(x,y)\geq 0$ and $f_2(x,y)\geq 0$ being two arbitrary different positive numbers; with regard to G(u,v) in the u-v plane, a second theorem indicates that an input signal is expressed by a difference between signals $G_1(u,v)\geq 0$ and $G_2(u,v)\geq 0$ being two arbitrary different positive numbers.

First, the way to remove the limitation associated with f(x,y) will be described. Assuming an arbitrary f(x,y) in which there is not limitation condition of a positive number or a negative number, according to the first theorem of FIG. 4, $f_1(x,y)$ and $f_2(x,y)$ that satisfy $f(x,y)=f_1(x,y)-f_2(x,y)$ and in which there is a limitation condition of a positive number may certainly exist ($f_1(x,y)\geq 0$ and $f_2(x,y)\geq 0$). Also, because the additivity FT2 of FIG. 3 is applied to the Fourier transform, $\{\mathcal{F}(x,y)\}(u,v)\cdot G(u,v)$ may be expressed by Equation 1 below.

[Equation 1]

$$
\begin{aligned}
&\mathcal{F}\{f(x,y)\}(u,v)\cdot G(u,v) = \\
&\quad \mathcal{F}\{f_1(x,y)-f_2(x,y)\}(u,v)\cdot G(u,v) = \\
&\quad (\mathcal{F}\{f_1(x,y)\}(u,v)-\mathcal{F}\{f_2(x,y)\}(u,v))\cdot G(u,v) = \\
&\quad \mathcal{F}\{f_1(x,y)\}(u,v)\cdot G(u,v)-\mathcal{F}\{f_2(x,y)\}(u,v)\cdot G(u,v)
\end{aligned}
$$

That is, $\mathcal{F}\{f(x,y)\}(u,v)\cdot G(u,v)$ may be expressed by a difference between $\mathcal{F}\{f_1(x,y)\}(u,v)\cdot G(u,v)$ and $\mathcal{F}\{f_2(x,y)\}(u,v)\cdot G(u,v)$. Now, when the inverse property IFT1 of FIG. 3 is applied, Equation 1 above may be expressed like Equation 2 below through the inverse Fourier transform.

[Equation 2]

$$
\begin{aligned}
&\mathcal{F}^{-1}\{\mathcal{F}\{f(x,y)\}(u,v)\cdot G(u,v)\}(x,y) = \\
&\quad \mathcal{F}^{-1}\{\mathcal{F}\{f_1(x,y)\}(u,v)\cdot G(u,v)-\mathcal{F}\{f_2(x,y)\}(u,v)\cdot G(u,v)\} \\
&\quad (x,y) = \mathcal{F}^{-1}\{\mathcal{F}\{f_1(x,y)\}(u,v)\cdot G(u,v)\}(x,y) - \\
&\quad \mathcal{F}^{-1}\{\mathcal{F}\{f_2(x,y)\}(u,v)\cdot G(u,v)\}(x,y)
\end{aligned}
$$

Herein, as described above, in the case of f(x,y), because it is assumed that there is no special limitation condition, $\mathcal{F}^{-1}\{\mathcal{F}\{f(x,y)\}(u,v)\cdot G(u,v)\}(x,y)$ may be calculated through the optical 4f system 100 of FIG. 1. However, because $f_1(x,y)$ and $f_2(x,y)$ have a positive number limitation condition, both $\mathcal{F}^{-1}\{\mathcal{F}\{f_1(x,y)\}(u,v)\cdot G(u,v)\}(x,y)$ and $\mathcal{F}^{-1}\{\mathcal{F}\{f_2(x,y)\}(u,v)\cdot G(u,v)\}(x,y)$ of Equation 2 above may be calculated through the optical 4f system 100. Accordingly, when an arbitrary f(x,y) and G(u,v) being a positive number are given, a value of $\mathcal{F}^{-1}\{\mathcal{F}\{f(x,y)\}(u,v)\cdot G(u,v)\}(x,y)$ may be obtained through a difference between values corresponding to results of respectively calculating $\mathcal{F}^{-1}\{\mathcal{F}\{f_1(x,y)\}(u,v)\cdot G(u,v)\}(x,y)$ and $\mathcal{F}^{-1}\{\mathcal{F}\{f_2(x,y)\}(u,v)\cdot G(u,v)\}(x,y)$ through the optical 4f system 100.

Next, the way to remove the limitation associated with G(u,v) will be described. Assuming an arbitrary G(u,v) in which there is no limitation condition of a positive number or a negative number, according to the second theorem of FIG. 4, $G_1(u,v)$ and $G_2(u,v)$ that satisfy $G(u,v)=G_1(u,v)-G_2(u,v)$ and have a positive number limitation condition may certainly exist ($G_1(u,v)\geq 0$ and $G_2(u,v)\geq 0$). Also, because the additivity FT2 of FIG. 3 is applied to the Fourier transform, $\mathcal{F}\{f(x,y)\}(u,v)\cdot G(u,v)$ may be expressed by Equation 3 below.

$$\begin{aligned}\mathcal{F}\{f(x,y)\}(u,v)\cdot G(u,v) &= \\ \mathcal{F}\{f(x,y)\}(u,v)\cdot(G_1(u,v)-G_2(u,v)) &= \\ \mathcal{F}\{f(x,y)\}(u,v)\cdot G_1(u,v)-\mathcal{F}\{f(x,y)\}(u,v)\cdot G_2(u,v)&\end{aligned} \quad \text{[Equation 3]}$$

That is, $\mathcal{F}\{f(x,y)\}(u,v)\cdot G(u,v)$ may be expressed by a difference between $\mathcal{F}\{f(x,y)\}(u,v)\cdot G_1(u,v)$ and $\{f(x,y)\}(u,v)\cdot G_2(u,v)$. Now, when the inverse property IFT1 of FIG. 3 is applied, Equation 3 above may be expressed like Equation 4 below through the inverse Fourier transform.

$$\begin{aligned}&\mathcal{F}^{-1}\{\mathcal{F}\{f(x,y)\}(u,v)\cdot G(u,v)\}(x,y) = \\ &\mathcal{F}^{-1}\{\mathcal{F}\{f_1(x,y)\}(u,v)\cdot G_1(u,v)-\mathcal{F}\{f(x,y)\}(u,v)\cdot G_2(u,v)\} \\ &(x,y)=\mathcal{F}^{-1}\{\mathcal{F}\{f(x,y)\}(u,v)\cdot G_1(u,v)\}(x,y)- \\ &\mathcal{F}^{-1}\{\mathcal{F}\{f(x,y)\}(u,v)\cdot G_2(u,v)\}(x,y)\end{aligned} \quad \text{[Equation 4]}$$

According, when f(x,y) being a positive number and an arbitrary G(u,v) are given, a value of $\mathcal{F}^{-1}\{\mathcal{F}\{f(x,y)\}(u,v)\cdot G(u,v)\}(x,y)$ may be obtained through a difference between values corresponding to results of respectively calculating $\mathcal{F}^{-1}\{\mathcal{F}\{f(x,y)\}(u,v)\cdot G_1(u,v)\}(x,y)$ and $\mathcal{F}^{-1}\{\mathcal{F}\{f(x,y)\}(u,v)\cdot G_2(u,v)\}(x,y)$ through the optical 4f system 100.

Now, the way to remove all the limitations associated with f(x,y) and G(u,v) will be described. According to the first theorem and the second theorem of FIG. 4, an arbitrary f(x,y) in which there is no limitation condition may satisfy $f(x,y)=f_1(x,y)-f_2(x,y)$ ($f_1(x,y)\geq 0$ and $f_2(x,y)\geq 0$), and an arbitrary G(u,v) in which there is no limitation condition may satisfy $G(u,v)=G_1(u,v)-G_2(u,v)$ ($G_1(u,v)\geq 0$ and $G_2(u,v)\geq 0$); in this case, when the additivity FT2 of FIG. 3 is applied, $\mathcal{F}\{f(x,y)\}(u,v)\cdot G(u,v)$ may be expressed by Equation 5 below.

$$\begin{aligned}&\mathcal{F}\{f(x,y)\}(u,v)\cdot G(u,v) = \\ &\mathcal{F}\{f_1(x,y)-f_2(x,y)\}(u,v)\cdot G(u,v) = \\ &(\mathcal{F}\{f_1(x,y)\}(u,v)-\mathcal{F}\{f_2(x,y)\}(u,v))\cdot G(u,v) = \\ &(\mathcal{F}\{f_1(x,y)\}(u,v)-\mathcal{F}\{f_2(x,y)\}(u,v))\cdot(G_1(u,v)-G_2(u,v)) = \\ &\mathcal{F}\{f_1(x,y)\}(u,v)\cdot G_1(u,v)-\mathcal{F}\{f_2(x,y)\}(u,v)\cdot G_1(u,v)- \\ &\mathcal{F}\{f_1(x,y)\}(u,v)\cdot G_2(u,v)+\mathcal{F}\{f_2(x,y)\}(u,v)\cdot G_2(u,v)\end{aligned} \quad \text{[Equation 5]}$$

Now, when the inverse property IFT1 of FIG. 3 is applied, a result of Equation 5 above may be expressed by Equation 6 below through the inverse Fourier transform.

$$\begin{aligned}&\mathcal{F}^{-1}\{\mathcal{F}\{f(x,y)\}(u,v)\cdot G(u,v)\}(x,y) = \\ &\mathcal{F}^{-1}\{\mathcal{F}\{f_1(x,y)\}(u,v)\cdot G_1(u,v)-\mathcal{F}\{f_2(x,y)\}(u,v)\cdot G_1(u,v)- \\ &\mathcal{F}\{f_1(x,y)\}(u,v)\cdot G_2(u,v)+\mathcal{F}\{f_2(x,y)\}(u,v)\cdot G_2(u,v)\}(x,y) = \\ &\mathcal{F}^{-1}\{\mathcal{F}\{f_1(x,y)\}(u,v)\cdot G_1(u,v)\}(x,y)- \\ &\mathcal{F}^{-1}\{\mathcal{F}\{f_2(x,y)\}(u,v)\cdot G_1(u,v)\}(x,y)- \\ &\mathcal{F}^{-1}\{\mathcal{F}\{f_1(x,y)\}(u,v)\cdot G_2(u,v)\}(x,y)+ \\ &\mathcal{F}^{-1}\{\mathcal{F}\{f_2(x,y)\}(u,v)\cdot G_2(u,v)\}(x,y)\end{aligned} \quad \text{[Equation 6]}$$

Accordingly, $\mathcal{F}\{f(x,y)\}(u,v)\cdot G(u,v)$ including f(x,y) and G(u,v) in which there is no positive number limitation condition may be incapable of being calculated directly through the optical 4f system 100 but may be expressed through $f_1(x,y)\geq 0$, $f_2(x,y)\geq 0$, $G_1(u,v)\geq 0$, and $G_2(u,v)\geq 0$ like Equation 6 above. Therefore, $\mathcal{F}\{f(x,y)\}(u,v)\cdot G(u,v)$ for arbitrary f(x,y) and G(u,v) may be calculated by respectively calculating $\mathcal{F}^{-1}\{\mathcal{F}\{f_1(x,y)\}(u,v)\cdot G_1(u,v)\}(x,y)$, $\mathcal{F}^{-1}\{\mathcal{F}\{f_2(x,y)\}(u,v)\cdot G_1(u,v)\}(x,y)$, $\mathcal{F}^{-1}\{\mathcal{F}\{f_1(x,y)\}(u,v)\cdot G_2(u,v)\}(x,y)$, and $\mathcal{F}^{-1}\{\mathcal{F}\{f_1(x,y)\}(u,v)\cdot G_2(u,v)\}(x,y)$ by using the optical 4f system 100 four times and then adding differences thereof. As such, the limitations associated with f(x,y) and G(u,v) may be removed, and the convolution operation using the optical 4f system 100 may be extended.

Until now, a method in which the convolution operation of the optical 4f system 100 of FIG. 1 is extended by removing positive number limitations associated with f(x,y) and G(u,v) is described. However, referring to Equation 6 above, the convolution operation using the optical 4f system 100 should be performed four times to draw an operation result which is not limited to only a positive number. Below, the way to optimize an extended convolution operation by using the number of necessary convolution operations will be described.

FIG. 5 illustrates theorems used for extension of an extended convolution operation. With regard to the x-y plane f(x,y), a third theorem indicates that an input signal for G(u,v) is expressed by a difference between a signal (x,y)≥0 being an arbitrary positive number and a positive constant (a≥0 and b≥0); with regard to the u-v plane, a fourth theorem indicates that an input signal for G(u,v) is expressed by a difference between a signal G'(u,v)≥0 being an arbitrary positive number and a positive constant (a≥0 and b≥0).

First, the way to optimize a convolution operation for an arbitrary G(u,v) through the fourth theorem will be described. In detail, f(x,y) may be optimized similarly by applying the third theorem, and thus, additional description will be omitted to avoid redundancy. After the optimization of G(u,v) is described, the way to optimize both f(x,y) and G(u,v) will be described.

According to the fourth theorem, because G(u,v) is expressed like G'(u,v)−b (G'(u,v)≥0, b≥0), $\mathcal{F}\{f(x,y)\}(u,v)\cdot G(u,v)$ may be expressed by Equation 7 below by applying the additivity FT2 of FIG. 3.

$$\begin{aligned}&\mathcal{F}\{f(x,y)\}(u,v)\cdot G(u,v)=\mathcal{F}\{f(x,y)\}(u,v)\cdot(G'(u,v)-b) = \\ &\mathcal{F}\{f(x,y)\}(u,v)\cdot G'(u,v)-\mathcal{F}\{f(x,y)\}(u,v)\cdot b = \\ &\mathcal{F}\{f(x,y)\}(u,v)\cdot G'(u,v)-b\cdot\mathcal{F}\{f(x,y)\}(u,v) = \\ &\mathcal{F}\{f(x,y)\}(u,v)\cdot G'(u,v)-\mathcal{F}\{b\cdot f(x,y)\}(u,v)\end{aligned} \quad \text{[Equation 7]}$$

That is, $\mathcal{F}$ {f(x,y)}(u,v)·G(u,v) may be expressed by a difference between $\mathcal{F}$ {f(x,y)}(u,v)·G'(u,v) and $\mathcal{F}$ {b f(x,y)}(u,v). Now, when both the inverse property IFT1 and the distributive property for addition IFT2 are applied, $\mathcal{F}$ {f(x,y)}(u,v)·G(u,v) may be expressed by Equation 8 below through the inverse Fourier transform.

$$\begin{aligned}&\mathcal{F}^{-1}\{\mathcal{F}\{f(x,y)\}(u,v)\cdot G(u,v)\}(x,y) = \\ &\mathcal{F}^{-1}\{\mathcal{F}\{f(x,y)\}(u,v)\cdot G'(u,v) - \mathcal{F}\{b\cdot f(x,y)\}(u,v)\}(x,y) = \\ &\mathcal{F}^{-1}\{\mathcal{F}\{f(x,y)\}(u,v)\cdot G'(u,v)\}(x,y) - \mathcal{F}^{-1}\{\mathcal{F}\{b\cdot f(x,y)\}(u,v)\} \\ &(x,y) = \mathcal{F}^{-1}\{\mathcal{F}\{f(x,y)\}(u,v)\cdot G'(u,v)\}(x,y) - b\cdot f(x,y)\end{aligned} \qquad \text{[Equation 8]}$$

Because G'(u,v) is a positive number, the operation using the optical 4f system 100 may be possible; because b·f(x,y) is capable of being calculated by directly multiplying an input f(x,y) and a constant "b" together without using the optical 4f system 100, unlike Equation 4 that requires the operation using the optical 4f system 100 two times, the operation ($\mathcal{F}$ {{f(x,y)}(u,v)·G'(u,v)}(x,y)) using the optical 4f system 100 may be required only once, and thus, the convolution operation may be optimized.

Finally, how to optimize arbitrary f(x,y) and G(u,v) will be described. According to the fourth theorem, because f(x,y) is capable of being expressed like f'(x,y)–a(f'(x,y)≥0, a≥0) and G(u,v) is capable of being expressed like G'(u,v)–b(G'(u,v)≥0, b≥0), $\mathcal{F}$ {f(x,y)}(u,v)·G(u,v) may be expressed by Equation 9 below by applying the homogeneity FT1 and the additivity FT2 of FIG. 3 together.

$$\begin{aligned}&\mathcal{F}\{f(x,y)\}(u,v)\cdot G(u,v) = \mathcal{F}\{f(x,y)\}(u,v)\cdot(G'(u,v)-b) = \\ &\mathcal{F}\{f(x,y)\}(u,v)\cdot G'(u,v) - \mathcal{F}\{f(x,y)\}(u,v)\cdot b = \\ &\mathcal{F}\{f(x,y)\}(u,v)\cdot G'(u,v) - b\cdot\mathcal{F}\{f(x,y)\}(u,v) = \\ &\mathcal{F}\{f(x,y)\}(u,v)\cdot G'(u,v) - \mathcal{F}\{b\cdot f(x,y)\}(u,v) = \\ &\mathcal{F}\{f'(x,y)-a\}(u,v)\cdot G'(u,v) - \mathcal{F}\{b\cdot f(x,y)\}(u,v) = \\ &(\mathcal{F}\{f'(x,y)\}(u,v) - \mathcal{F}\{a\}(u,v))\cdot G'(u,v) - \mathcal{F}\{b\cdot f(x,y)\}(u,v) = \\ &\mathcal{F}\{f'(x,y)\}(u,v)\cdot G'(u,v) - \\ &\mathcal{F}\{a\}f(u,v)\cdot G'(u,v) - \mathcal{F}\{b\cdot f(x,y)\}(u,v)\end{aligned} \qquad \text{[Equation 9]}$$

That is, $\mathcal{F}$ {f(x,y)}(u,v)·G(u,v) may be calculated by using a difference between $\mathcal{F}$ {f(x,y)}(u,v)·G'(u,v), $\mathcal{F}$ {a}(u,v)·G'(u,v), and $\mathcal{F}$ {b f(x,y)}(u,v). Now, when both the inverse property IFT1 and the distributive property for addition IFT2 of FIG. 3 are applied, $\mathcal{F}$ {f(x,y)}(u,v)·G(u,v) may be expressed by Equation 10 below through the inverse Fourier transform.

$$\begin{aligned}&\mathcal{F}^{-1}\{\mathcal{F}\{f(x,y)\}(u,v)\cdot G(u,v)\}(x,y) = \\ &\mathcal{F}^{-1}\{\mathcal{F}\{f'(x,y)\}(u,v)\cdot G'(u,v) - \mathcal{F}\{a\}(u,v)\cdot G'(u,v) - \\ &\mathcal{F}\{b\cdot f(x,y)\}(u,v)\}(x,y) = \mathcal{F}^{-1}\{\mathcal{F}\{f'(x,y)\}(u,v)\cdot G'(u,v)\} \\ &(x,y) - \mathcal{F}^{-1}\{\mathcal{F}\{a\}(u,v)\cdot G'(u,v)\}(x,y)\} - \\ &\mathcal{F}^{-1}\{\mathcal{F}\{b\cdot f(x,y)\}(u,v)\}(x,y) = \mathcal{F}^{-1} \\ &\{\mathcal{F}\{f'(x,y)\{(u,v)\cdot G'(u,v)\}(x,y) - \\ &\mathcal{F}^{-1}\{\mathcal{F}\{a\}(u,v)\cdot G'(u,v)\}(x,y) - b\cdot f(x,y)\end{aligned} \qquad \text{[Equation 10]}$$

Because arbitrary f(x,y) and G(u,v) are not limited to a positive number, $\mathcal{F}^{-1}${$\mathcal{F}$ {f(x,y)}(u,v)·G(u,v)}(x,y) may be incapable of being calculated directly through the optical 4f system 100; however, because f'(x,y)≥0 and G'(u,v)≥0, $\mathcal{F}^{-1}${$\mathcal{F}$ {f(x,y)}(u,v)·G'(u,v)}(x,y) and $\mathcal{F}^{-1}${$\mathcal{F}$ {f(a)}(u,v)·G'(u,v)}(x,y) may be calculated through the optical 4f system 100, and b·f(x,y) may be calculated by directly multiplying an input f(x,y) and a constant "b" without using the optical 4f system 100. Therefore, unlike Equation 6 that requires the operation using the optical 4f system 100 four times, because only two operations ($\mathcal{F}^{-1}${$\mathcal{F}$ {f(x,y)}(u,v)·G'(u,v)}(x,y) and $\mathcal{F}^{-1}${$\mathcal{F}$ {f(a)}(u,v)·G'(u,v)}(x,y)) using the optical 4f system 100 are required, the convolution operation may be extended to a negative number input as well as a positive number input, and the number of operations may be optimized.

Figure 6:
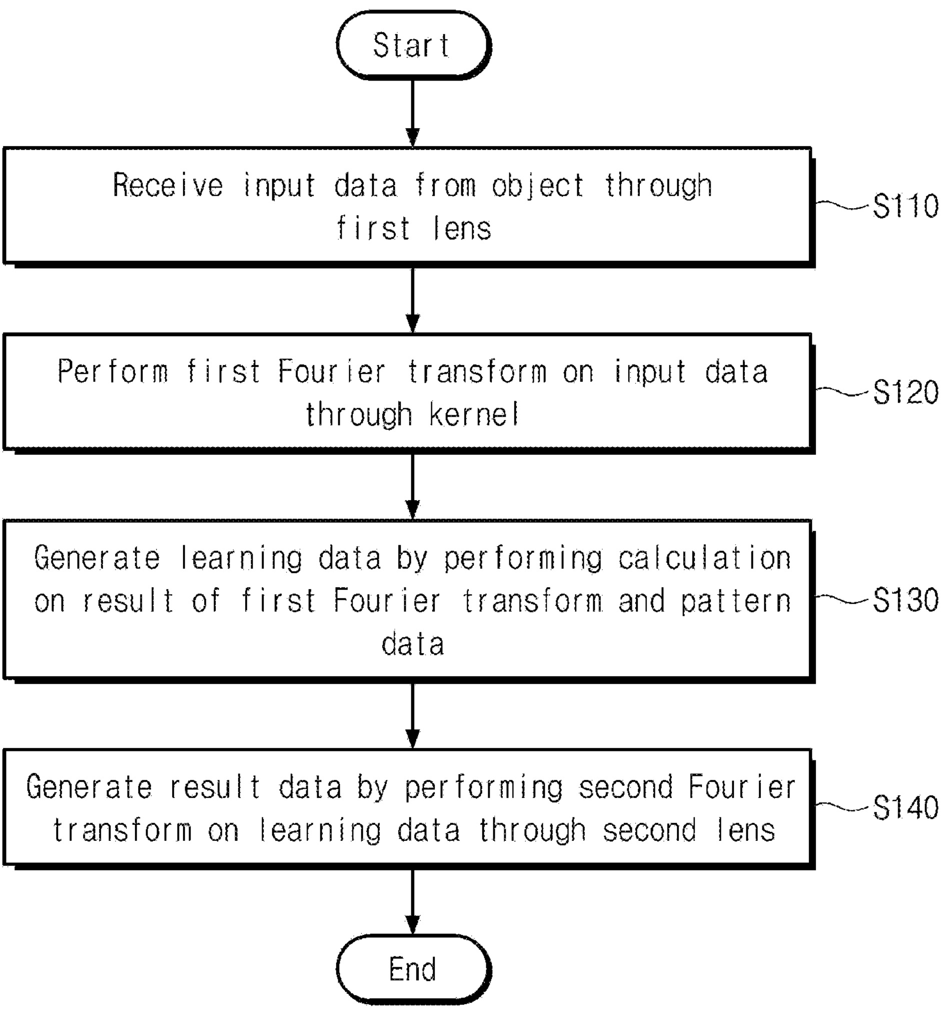
FIG. 6 is a flowchart illustrating an example of an operating method of an optical 4f system according to an embodiment of the present disclosure.

FIG. 6 is a flowchart illustrating an example of an operating method of the optical 4f system 100 according to an embodiment of the present disclosure. Below, the description will be given with reference to FIG. 1 together with FIG. 6.

In operation S110, the first lens 110 may receive input data from the object 10. In operation S120, the kernel 120 may perform the first Fourier transform on the input data, and in operation S130, the kernel 120 may generate learning data by performing calculation (e.g., a multiplication operation) on a result of the first Fourier transform and pattern data. In operation S140, the second lens 130 may generate result data by performing the second Fourier transform (e.g., inverse Fourier transform) on the learning data. Herein, the kernel 120 may correspond to a filter of the CNN, and an image indicated by the input data and an image indicated by the result data may be inverted images.

In conclusion, through embodiments of the present disclosure, the convolution operation using the optical 4f system may be performed on f(x,y) and G(u,v) including both a positive number and a negative number, and a result of the convolution operation may also include both a positive number and a negative number. As such, the following are obtained.

As described with reference to FIG. 1, f(x,y) is the first input image of the CNN or an input value of a previous CNN layer. Because there is a limitation condition that f(x,y) must always be a positive number, it is difficult to use the conventional optical 4f system in the artificial intelligence and machine learning fields such as CNN; however, according to an embodiment of the present disclosure, because the limitation associated with f(x,y) is removed, the optical 4f system may be applied to the CNN including a plurality of convolution layers.

G(u,v) is an image pattern that is trained in the CNN. When there are provided a variety of patterns that is capable of being trained in the machine learning field, a learning result of the CNN may be excellent. Because there was a constraint condition that G(u,v) must always be a positive number, when a conventional optical 4f system is applied to the CNN, a CNN learning result may be degraded; however, according to an embodiment of the present disclosure, because the limitation associated with G(u,v) is removed, learning and inference results of the CNN may be improved when a variety of patterns are trained.

Also, because a value generated in the conventional optical 4f system is always a positive number, some non-linear functions may not operate properly, resulting in the reduction of CNN performance. For example, because a nonlinear function such as a rectified linear unit (ReLU) acts as an identity function when an input value is positive, it is impossible to express a characteristic of the nonlinear function. In this case, because a multi-layer neural network operates only as a linear function, the multi-layer neural network performs only a role of a single-layer neural network. According to an embodiment of the present disclosure, because the limitations associated with a convolution result are removed, an image generated by an optical 4f system according to an embodiment of the present disclosure may be input to the ReLU function to perform CNN learning and inference.

The optical 4f system according to embodiments of the present disclosure is not limited to being used for the convolution operation and may be used for a variety of alternative purposes. In addition, the optical 4f system according to an embodiment of the present disclosure may be used in combination with many existing computing systems and devices including a processor. For example, the processor may include a special purpose processing device such as an application-specific integrated circuit (ASIC), a programmable array logic (PAL), a programmable logic array (PLA), a programmable logic device (PLO), or a field programmable gate array (FPGA), or any other custom and/or programmable device. A computing device may also include storage devices such as a static RAM, a dynamic RAM, a ROM, a CD-ROM, a magnetic tape, an optical disk, a flash memory, a non-transitory computer readable medium, or any other machine readable medium.

According to an embodiment of the present invention, as an optical 4f system may be applied to a CNN including a plurality of convolution layers, more diverse image patterns may be trained, and thus, learning and reasoning results of the CNN may be improved.

Also, according to an embodiment of the present invention, a convolution result value may also be output as various values including negative numbers, and thus, CNN learning and inference may be performed in conjunction with a ReLU-based nonlinear function.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An optical system comprising:

a first lens configured to receive input data from an object and to perform a first Fourier transform of the input data such that a Fourier-transformed signal is formed at a location of a kernel;

the kernel disposed at the location at which the Fourier-transformed signal is formed, the kernel being configured to generate learning data by performing a convolution operation on a result of the first Fourier transform of the input data and pattern data; and a second lens configured to generate result data by performing a second Fourier transform on the learning data, wherein values used in the convolution operation of the optical system are defined based on a light amplitude, while actual input values and actual output values of the optical system are proportional to a light intensity, wherein the input data are representable as a difference between a first non-negative input signal and a second non-negative input signal, wherein the pattern data are representable as a difference between a first non-negative pattern signal and a second non-negative pattern signal, and wherein the result data include both a positive number and a negative number and are obtained by:

performing optical calculations on non-negative signals corresponding to the input data and the pattern data without generating a negative light intensity, and recombining results of the optical calculations to generate the result data including both the positive number and the negative number.

2. The optical system of claim 1, wherein an image represented by the input data has a phase opposite to that of an image represented by the result data.

3. The optical system of claim 1, wherein the kernel corresponds to a filter of a convolutional neural network (CNN).

4. The optical system of claim 1, wherein the learning data are calculated by Equation 1:

$$\mathcal{F}\{f(x,y)\}(u,v)\cdot G(u,v) = \mathcal{F}\{f_1(x,y)\}(u,v)\cdot G_1(u,v) - \mathcal{F}\{f_2(x,y)\}(u,v)\cdot G_1(u,v) - \mathcal{F}\{f_1(x,y)\}(u,v)\cdot G_2(u,v) + \mathcal{F}\{f_2(x,y)\}(u,v)\cdot G_2(u,v)$$

where x and y denote spatial coordinates of two-dimensional input data in a spatial domain, u and v denote frequency coordinates corresponding to the spatial coordinates, f(x, y) denotes the input data in the spatial domain, G(u, v) denotes the pattern data in a frequency domain, the operator "·" denotes a multiplication operation performed in the frequency domain, $\mathcal{F}$ {f(x, y)}(u, v) denotes a result of the first Fourier transform for the f(x, y), $f_1(x, y) \geq 0$, $f_2(x, y) \geq 0$, $G_1(u, v) \geq 0$, and $G_2(u, v) \geq 0$.

5. The optical system of claim 4, wherein the result data are calculated by Equation 2:

$$F^{-1}\{F\{f(x,y)\}(u,v)\bullet G(u,v)\}(x,y) = F^{-1}\{F\{f_1(x,y)\}(u,v)\bullet G_1(u,v)\}(x,y) - F^{-1}\{F\{f_2(x,y)\}(u,v)\bullet G_1(u,v)\}(x,y) - F^{-1}\{F\{f_1(x,y)\}(u,v)\bullet G_2(u,v)\}(x,y) + F^{-1}\{F\{f_1(x,y)\}(u,v)\bullet G_2(u,v)\}(x,y).$$

6. The optical system of claim 1, wherein the learning data are calculated by Equation 3:

$$\mathcal{F}\{f(x,y)\}(u,v)\cdot G(u,v) = \mathcal{F}\{f'(x,y)\}(u,v)\cdot G'(u,v) - \mathcal{F}\{a\}(u,v)\cdot G'(u,v) - \mathcal{F}\{b\cdot f(x,y)\}(u,v)$$

where x and y denote spatial coordinates of two-dimensional input data in a spatial domain, u and v denote frequency coordinates corresponding to the spatial coordinates, f(x, y) denotes the input data in the spatial domain, G(u, v) denotes the pattern data in a frequency domain, the operator "·" denotes a multiplication operation performed in the frequency domain, $\mathcal{F}$ {f(x, y)}(u, v) denotes a result of the first Fourier transform for the f(x, y), $f'(x, y) \geq 0$, $g(x, y) \geq 0$, $a \geq 0$, and $b \geq 0$.

7. The optical system of claim 6, wherein the result data are calculated by Equation 4:

$$F^{-1}\{F\{f(x,y)\}(u,v)\bullet G(u,v)\}(x,y) = F^{-1}\{F\{f(x,y)\}(u,v)\bullet G'(u,v)\}(x,y) - F^{-1}\{F\{f(a)\}(u,v)\bullet G'(u,v)\}(x,y) - b\bullet f(x,y).$$

8. The optical system of claim 1, wherein the result data are input to a ReLU (Rectified Linear Unit) function.

9. An operating method of an optical system which includes a first lens, a kernel, and a second lens, the operating method comprising:

receiving input data from an object through the first lens;

performing a first Fourier transform on the input data such that a Fourier-transformed signal is formed at a location of the kernel;

generating learning data by performing a convolution operation on a result of the first Fourier transform of the input data and pattern data; and generating result data by performing a second Fourier transform on the learning data, wherein values used in the convolution operation of the optical system are defined based on a light amplitude, while actual input values and actual output values of the optical system are proportional to a light intensity, and wherein the result data include both a positive number and a negative number, the result data being obtained by:

representing the input data as a difference between a first non-negative input signal and a second non-negative input signal, representing the pattern data as a difference between a first non-negative pattern signal and a second non-negative pattern signal, performing optical calculations on non-negative signals corresponding to the input data and the pattern data without generating a negative light intensity, and recombining results of the optical calculations to generate the result data including both the positive number and the negative number.

10. The operating method of claim 9, wherein an image represented by the input data has a phase opposite to that of an image represented by the result data.

11. The operating method of claim 9, wherein the kernel corresponds to a filter of a convolutional neural network (CNN).

12. The operating method of claim 9, wherein the generating of the learning data includes generating the learning data based on Equation 1:

$$\mathcal{F}\{f(x, y)\}(u, v)\cdot G(u, v) = \mathcal{F}\{f_1(x, y)\}(u, v)\cdot G_1(u, v) - \mathcal{F}\{f_2(x, y)\}(u, v)\cdot G_1(u, v) - \mathcal{F}\{f_1(x, y)\}(u, v)\cdot G_2(u, v) + \mathcal{F}\{f_2(x, y)\}(u, v)\cdot G_2(u, v)$$

where x and y denote spatial coordinates of two-dimensional input data in a spatial domain, u and v denote frequency coordinates corresponding to the spatial coordinates, f(x, y) denotes the input data in the spatial domain, G(u, v) denotes the pattern data in a frequency domain, the operator "·" denotes a multiplication operation performed in the frequency domain, $\mathcal{F}$ {f(x, y)}(u, v) denotes a result of the first Fourier transform for the f(x, y), $f_1(x, y)\geq 0$, $f_2(x, y)\geq 0$, $G_1(u, v)\geq 0$, and $G_2(u, v)\geq 0$.

13. The operating method of claim 12, wherein the generating of the result data includes generating the result data based on Equation 2:

$$F^{-1}\{F\{f(x, y)\}(u, v)\bullet G(u, v)\}(x, y) = F^{-1}\{F\{f_1(x, y)\}(u, v)\bullet G_1(u, v)\}(x, y) - F^{-1}\{F\{f_2(x, y)\}(u, v)\bullet G_1(u, v)\}(x, y) - F^{-1}\{F\{f_1(x, y)\}(u, v)\bullet G_2(u, v)\}(x, y) + F^{-1}\{F\{f_1(x, y)\}(u, v)\bullet G_2(u, v)\}(x, y).$$

14. The operating method of claim 9, wherein the generating of the learning data includes generating the learning data based on Equation 3:

$$\mathcal{F}\{f(x, y)\}(u, v)\cdot G(u, v) = \mathcal{F}\{f'(x, y)\}(u, v)\cdot G'(u, v) - \mathcal{F}\{a\}(u, v)\cdot G'(u, v) - \mathcal{F}\{b\cdot f(x, y)\}(u, v)$$

where x and y denote spatial coordinates of two-dimensional input data in a spatial domain, u and v denote frequency coordinates corresponding to the spatial coordinates, f(x, y) denotes the input data in the spatial domain, G(u, v) denotes the pattern data in a frequency domain, the operator "·" denotes a multiplication operation performed in the frequency domain, $\mathcal{F}$ {f(x, y)}(u, v) denotes a result of the first Fourier transform for the f(x, y), $f'(x, y)\geq 0$, $g(x, y)\geq 0$, $a\geq 0$, and $b\geq 0$.

15. The operating method of claim 14, wherein the generating of the result data includes generating the result data based on Equation 4:

$$F^{-1}\{F\{f(x, y)\}(u, v)\bullet G(u, v)\}(x, y) = F^{-1}\{F\{f(x, y)\}(u, v)\bullet G'(u, v)\}(x, y) - F^{-1}\{F\{f(a)\}(u, v)\bullet G'(u, v)\}(x, y) - b\bullet f(x, y).$$

16. The operating method of claim 9, further comprising: inputting the result data to a ReLU (Rectified Linear Unit) function.

* * * * *